Patented Apr. 20, 1954

2,676,191

UNITED STATES PATENT OFFICE 2,676,191

DEALKYLATION OF 2,5-TERT. ALKYL-PHENOL COMPOUNDS

James R. Hoatson, Clarendon Hills, and Robert H. Rosenwald, Western Springs, Ill., assignors to Universal Oil Products Company, Chicago, Ill., a corporation of Delaware No Drawing. Application November 25, 1949, Serial No. 129,528

14 Claims. (Cl. 260—613)

This invention relates to a process for the dealkylation of a particular class of phenolic compounds containing tert-alkyl substituents in the 2 and the 5 positions. More particularly, and in the preferred application of the process, the invention concerns the dealkylation of 2,5-di-tert-alkylphenols containing an alkoxy substituent para to the hydroxyl group of the phenol.

In the alkylation of p-alkoxyphenols with an alkylating agent containing a tert-alkyl group for the intended production of a mono-substituted tert-alkylphenol, the tert-alkyl group occupying the ortho position relative to the hydroxyl group of the phenol, it is found that an appreciable yield of the di-tert-alkyl substituted alkoxy phenol is obtained in which the alkyl groups occupy ortho and meta positions relative to the hydroxyl group or ortho positions relative to the hydroxyl and p-alkoxyl groups respectively. The compounds of the class characterized as meta-tert-alkyl-p-alkoxyphenols, and particularly the meta-tert-butyl-p-methoxyphenols are known for their oxidation inhibiting potency and for stabilizing organic compounds against oxidation and the development of rancidity therein. The corresponding 2,5-tert-alkyl-4-alkoxyphenols are much less potent as oxidation inhibitors and it therefore becomes desirable to convert the 2,5-di-tert-alkyl compound, invariably formed as a by-product in the alkylation of the p-alkoxy-phenol starting material, to the mono-alkyl substituted, 3-tert-alkyl-p-alkoxy phenol. By the selective dealkylation of the 2-tert-alkyl group from the 2,5-di-tert-alkyl substituted compound the yield of the desired 3-tert-alkyl-4-alkoxyphenol is thereby increased from a given charge of p-alkoxyphenol starting material. The present selective dealkylation process provides a convenient and effective means for the attainment of that objective.

In one of its embodiments this invention concerns a process for selective dealkylation of a 2,5-di-tert-alkyl-phenol containing a substituent other than an hydroxyl group in the p-position which comprises subjecting said di-tert-alkyl-phenol to a temperature of from about 100° to about 400° C. and separating the resulting mono-alkyl substituted 3-tert-alkylphenol from the dealkylation reaction mixture.

A more specific embodiment of the invention relates to a process for the selective dealkylation of a 2,5-di-tert-butyl-p-alkoxyphenol which comprises subjecting said di-tert-alkylphenol to a temperature of from about 100° to about 300° C. in the presence of an acid-acting catalyst and continuously separating 3-tert-butyl-p-alkoxyphenol from the reaction mixture.

Other embodiments of the invention relating to specific aspects of the dealkylation process will be referred to in greater detail in the following further description.

The present dealkylation process is particularly directed to the production of 3-tert-alkyl-p-alkoxyphenols from the corresponding 2,5-di-tert-alkyl derivatives for the reasons hereinabove indicated, especially where the mono-tert-alkyl derivative in which the alkyl group is meta with respect to the hydroxyl group is a more potent and preferred product compared to the di-tert-alkyl derivative, as in the case of oxidation inhibitors, hereinabove noted. The present process is, however, also effectively applied when it is desired to dealkylate a 2,5-di-tert-alkylphenol containing no substituent para to the hydroxyl group or to compounds containing a substituent other than an alkoxyl radical para to the hydroxyl group. Thus, a 2,5-di-tert-alkylphenol, such as 2,5-di-tert-butylphenol, 2,5 - di - tert - amylphenol, 2,5-tert - amyl - 5-tert-butylphenol etc., and compounds of corresponding structure in which the para position of the phenol is additionally substituted with diverse substituents may likewise be utilized as charging stocks in the present dealkylation process. 2,5-di-tert-alkylphenols of the latter class are represented, for example, by such compounds in which the p-substituent is a nitro, alkylthio, amino, cyano, halo, keto, nitroso, etc., radicals, exemplified by such compounds as 2,5-di-tert-butyl-4-alkylthiophenol, 2,5-di-tert-butyl-4-nitrophenol, 2,5 - di - tert-butyl-4-chlorophenol, 2,5 - di - tert-amyl-4-aminophenol, etc. These phenolic derivatives, as well as the preferred p-alkoxy derivatives, have the following empirical formula:

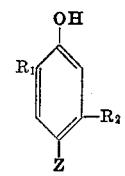

in which R₁ and R₂ are tert-alkyl groups and Z represents a radical other than an hydroxyl group. In the case of the preferred p-alkoxy substituted compounds utilizable herein as charging stocks, Z represents an alkoxyl group, and the compounds having the following empirical formula:

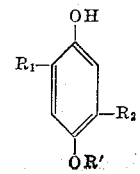

in which R' may be any alkyl group, primary, secondary or tertiary in structure containing not more than about 8 carbon atoms per group, such as methyl, ethyl, propyl, isopropyl, butyl, isobutyl, sec-butyl, tert-butyl, amyl, isoamyl, sec-amyl, tert-amyl, etc., while $R_1$ and $R_2$ may be tert-alkyl groups containing not more than about 8 carbon atoms per group, such as tert-butyl, tert-amyl, 2,2-di-methyl butyl, 2,2-di-methylamyl, etc. When the present dealkylation process is operated to produce the preferred oxidation inhibitors by dealkylation of the 2-tert-alkyl group from a 2,5-di-tert-alkyl-4-alkoxyphenol, the alkyl group of the alkoxyl radical is preferably a relatively short chain group, such as methyl, ethyl, propyl, and isopropyl, the latter compounds having a greater degree of inhibiting potency.

Dealkylation of the selected phenolic compounds as charging stocks in accordance with the present process is effected by subjecting the di-tert-alkylphenol or a p-substituted derivative thereof to a temperature of from about 100° to about 400° C., which in the case of certain charging stocks is desirably conducted in the presence of a catalyst of the acid-acting type for the purpose of reducing the required temperature of dealkylation or increasing the yield of dealkylated product therefrom. In the presence of the acid-acting catalyst, the dealkylation generally proceeds at a temperature of from about 100° to about 300° C., while in the absence of a catalyst, that is, by simple thermal dealkylation, temperatures of from about 200° to about 400° C., depending upon the boiling point of the mono-tert-alkylphenolic product, are required to obtain economical manufacture of the product within a reasonable reaction time. The use of a catalyst, therefore, in the reaction tends to reduce the required conversion temperature and period for effecting substantial dealkylation of a di-tert-alkylphenol charging stock. Suitable catalysts for enhancing the rate of dealkylation are selected from the general class of acid-acting substances, such as the mineral acids, including sulfuric, hydrochloric and phosphoric acids, acid organic compounds, such as the alkane and arylsulfonic acids, and certain hydrous metal oxide composites which have a pH less than 7 in the presence of moisture, such as intimately associated alumina-silica composites, composites of silica and phosphoric acid formed by the calcination of a silicious adsorbent, such as kieselguhr, with phosphoric acid, composites of silica and zirconia, and others well known in the art for their catalytic activity. The preferred catalysts for this purpose are the hydrocarbon sulfonic acids, the hydrous metal oxide composites and the calcined silica-phosphoric acid composites.

The dealkylation process of the present invention may be effected by either batch or continuous methods of production. In the simple batch procedure, a given charge of the 2,5-di-tert-alkylphenol derivative utilized as charging stock herein, is heated to the indicated thermal dealkylation temperature for a time sufficient to establish equilibrium in the alkyl transfer reactions occurring during the dealkylation process. The thermal method of dealkylation may be operated continuously by distilling from the di-tert-alkylphenol starting material the mono-tert-alkyl dealkylation product at reduced pressure, if necessary to obtain the desired dealkylation temperature, while concomitantly charging to the dealkylation reactor additional di-tert-alkylphenol starting material. Subatmospheric pressures are particularly desirable when utilizing a charging stock consisting of a high boiling derivative of the di-tert-alkylphenol starting material in which case the sub-atmospheric pressure reduces the boiling point of the dealkylation product to a temperature within the desired dealkylation reaction temperature.

Catalytic dealkylation and its accompanying advantages, primarily the acceleration of the dealkylation rate is effected by incorporating into the di-tertiary-alkylphenol charging stock a catalyst of the aforementioned acid-acting substances having a catalytic effect in promoting the dealkylation reaction. The catalyzed reaction may also be made continuous by supplying additional charging stock to the dealkylation reactor containing the catalyst and continuously removing the mono-tert-alkylphenol dealkylation product by distillation from the reaction mixture. When utilizing a solid catalytic substance, such as a stationary bed of silica-alumina composite particles, continuous dealkylation may be effected by charging the di-tert-alkylphenol into a reactor containing the catalyst, allowing the charge to flow at the desired dealkylation reaction temperature over the bed of catalyst particles and thereafter transferring the resultant reaction mixture to a distillation unit from which the mono-tert-alkyl dealkylation product is separated by fractionation. In an alternative arrangement the dealkylation reactor containing the solid catalyst particles may be maintained at the vaporization temperature of the mono-tert-alkylphenol at reduced pressure, if necessary, and the resultant vapors of dealkylation product continuously fractionated from the di-tert-alkylphenol undergoing dealkylation. The di-alkylphenol which is a higher boiling material than the dealkylation product may be continuously recycled through the dealkylation reaction by refluxing the higher boiling fractions of the dealkylation reactor overhead. By means of suitable recycle arrangements, substantially 100% conversion of the di-tert-alkylphenol starting material may be converted to the mono-tert-alkylphenol product. The catalyst when utilized in the batch type process is added to the di-tert-alkylphenol and is incorporated therein in amounts of from about 0.5 to about 20% by weight of the reaction mixture.

The dealkylation process of the present invention is illustrated with reference to specific embodiments thereof in the following examples, which however, are not intended to unduly restrict the scope of the invention in accordance therewith.

*Example I*

In the following run 2,5-tert-butyl-4-methoxyphenol was subjected to thermal dealkylation at a temperature of from about 225° to about 260° C. by continuous fractional distillation at atmospheric pressure. The fractions were collected and analyzed by infra-red analysis to determine the proportion of various dealkylation products in the distillate. The first fraction, consisting of about 30% by volume of the original charge boiled at atmospheric pressure from about 225° to about 254° and contained 16% by weight of 4-methoxyphenol, 44% by weight of 2-tert-butyl-4-methoxyphenol, about 33% by weight of 3-tert-butyl-4-methoxyphenol and about 7% by weight of the 2,5-di-tert-butyl-4-methoxyphenol charging stock. A second fraction boiling from about 254° to about 259° C. comprising about 35% by weight of the charging stock contained approximately 8% by weight of 4-methoxyphenol, about 3% by weight of 2-tert-butyl-4-methoxyphenol, about 85% by weight of 3-tert-butyl-4-methoxyphenol, and about 4% by weight of 2,5-di-tert-butyl - 4 - methoxyphenol. A third fraction boiling at approximately 259° C. contained 2.4% by weight of 4-methoxyphenol, none of the 2-tert-butyl-4-methoxyphenol, approximately 94% by weight of 3-tert-butyl-4-methoxyphenol and about 3% by weight of 2,5-di-tert-butyl-4-methoxyphenol starting material. The approximate total yield in the once-through operation of the 3-tert-butyl-4-methoxyphenol was 73% and approximately 96% by weight of the total charge of 2,5-di-tert-butyl-4-methoxyphenol was converted to lower dealkylation products.

*Example II*

In the following run dealkylation of 2,5-di-tert-butyl-4-methoxyphenol was effected catalytically at a temperature of about 135° C. in the presence of a solid catalyst consisting of a composite of silica and alumina containing approximately 8% by weight of alumina. 45.8 grams of 2,5-di-tert-butyl-4-methoxyphenol and 7 grams of the silica-alumina catalyst particles were placed in a distillation flask and fractionally distilled at a pressure of about 12 mm. of mercury. The distillation was continued until approximately 22 grams of distillate was collected at 135° C. Infra-red analysis of the distillate indicated that it contained approximately 20 weight percent of 4-methoxyphenol, 24 weight percent of 2-tert-butyl-4-methoxyphenol, 43 weight percent of 3-tert-butyl-4-methoxyphenol, and approximately 13 weight percent of 2,5-di-tert-butyl-4-methoxyphenol or unconverted charging stock.

We claim as our invention:

1. A process for the selective dealkylation of a 2,5-di-tert-alkylphenol having a radical other than the hydroxyl group in the 4-position to form a 3-tert-alkylphenol which comprises heating said di-tert-alkylphenol in contact with an acid-acting dealkylation catalyst at a temperature of from about 100° to about 300° C.

2. The process of claim 1 further characterized in that said acid-acting dealkylation catalyst comprises silica and alumina.

3. The process of claim 1 further characterized in that said catalyst comprises a mineral acid.

4. The process of claim 1 further characterized in that said catalyst comprises a calcined composite of a siliceous adsorbent and phosphoric acid.

5. The process of claim 1 further characterized in that said catalyst comprises a hydrocarbon sulfonic acid.

6. The process of claim 1 further characterized in that said catalyst comprises silica and zirconia.

7. The process of claim 1 further characterized in that said tert-alkyl groups contain not more than 8 carbon atoms per alkyl group.

8. The process of claim 7 further characterized in that said tert-alkyl groups are tert-butyl.

9. The process of claim 1 further characterized in that said radical is a substituent for hydrogen.

10. The process of claim 9 further characterized in that said substituent is an alkoxy group.

11. A process for the selective dealkylation of a phenolic compound having the empirical formula:

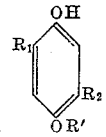

in which $R_1$ and $R_2$ are tert-alkyl groups containing not more than 8 carbon atoms per group and $R'$ is an alkyl group to form thereby a 3-tert-alkylphenol which comprises heating said phenolic compound in the presence of an acid-acting dealkylation catalyst to a temperature of from about 100° to about 300° C.

12. The process of claim 11 further characterized in that said $R_1$ and $R_2$ alkyl groups are tert-butyl and said $R'$ group is methyl.

13. The process of claim 11 further characterized in that said $R_1$ and $R_2$ alkyl groups are tert-butyl.

14. The process of claim 13 further characterized in that said $R'$ group is an alkyl group containing not more than 3 carbon atoms per alkyl group.

References Cited in the file of this patent

UNITED STATES PATENTS

| Number | Name | Date |
| --- | --- | --- |
| 1,324,143 | Brooks | Dec. 9, 1919 |
| 1,334,033 | Houlehan | Mar. 16, 1920 |
| 2,207,753 | Moyle et al. | July 16, 1940 |
| 2,222,632 | Sachanen et al. | Nov. 26, 1940 |
| 2,290,602 | Stevens et al. | July 21, 1942 |
| 2,290,603 | Stevens et al. | July 21, 1942 |
| 2,327,938 | Stevens et al. | Aug. 24, 1943 |
| 2,435,038 | Gilbert et al. | Jan. 27, 1948 |
| 2,470,902 | Rosenwald | May 24, 1949 |
| 2,514,960 | Luten et al. | July 11, 1950 |